(12) United States Patent
Lutnick et al.

(10) Patent No.: US 8,275,687 B2
(45) Date of Patent: Sep. 25, 2012

(54) ALLOCATION OF COMMISSIONS

(75) Inventors: Howard W. Lutnick, New York, NY (US); Michael Sweeting, Aldershot (GB); Joseph Noviello, New York, NY (US)

(73) Assignee: BGC Partners, Inc., New York, NY (US)

( * ) Notice: Subject to any disclaimer, the term of this patent is extended or adjusted under 35 U.S.C. 154(b) by 0 days.

(21) Appl. No.: 12/115,313

(22) Filed: May 5, 2008

(65) Prior Publication Data
US 2008/0215444 A1    Sep. 4, 2008

Related U.S. Application Data

(62) Division of application No. 11/213,601, filed on Aug. 26, 2005.

(60) Provisional application No. 60/605,091, filed on Aug. 27, 2004.

(51) Int. Cl.
G06Q 40/00    (2012.01)

(52) U.S. Cl. .......................................... 705/36 R; 705/37

(58) Field of Classification Search .................... 705/37, 705/36 R
See application file for complete search history.

(56) References Cited

U.S. PATENT DOCUMENTS

| | | | |
|---|---|---|---|
| 4,980,826 A | 12/1990 | Wagner | |
| 5,136,501 A | 8/1992 | Silverman et al. | |
| 5,414,624 A | 5/1995 | Anthonyson | |
| 5,842,178 A | 11/1998 | Giovannoli | |
| 5,905,974 A | 5/1999 | Fraser et al. | |
| 5,918,218 A | 6/1999 | Harris et al. | |
| 5,924,083 A | 7/1999 | Silverman et al. | |
| 6,029,146 A | 2/2000 | Hawkins et al. | |
| 6,317,727 B1 | 11/2001 | May | |
| 6,408,282 B1 | 6/2002 | Buist | |
| 6,421,653 B1 | 7/2002 | May | |
| 6,505,174 B1 | 1/2003 | Keiser et al. | |
| 6,560,580 B1 | 5/2003 | Fraser et al. | |
| 6,618,707 B1 * | 9/2003 | Gary | 705/36 R |
| 6,662,164 B1 | 12/2003 | Koppelman et al. | |
| 6,850,907 B2 | 2/2005 | Lutnick et al. | |
| 6,963,856 B2 | 11/2005 | Lutnick et al. | |
| 6,985,883 B1 | 1/2006 | Togher et al. | |
| 7,003,488 B2 | 2/2006 | Dunne et al. | |

(Continued)

FOREIGN PATENT DOCUMENTS

JP    2000-148850    5/2000

(Continued)

OTHER PUBLICATIONS

USPTO Office Action for U.S. Appl. No. 11/213,601, Apr. 14, 2008 (6 pages).

(Continued)

*Primary Examiner* — Samica L Norman
(74) *Attorney, Agent, or Firm* — David E. Boundy

(57) ABSTRACT

The invention relates to systems and methods that allocate different types of commissions to participants based on at least one factor contributing to the liquidity to the market in which an item trades. The commission may accordingly depend on the order in which trading commands are received from different participants and/or the sides the participants are on. The systems and methods receive trade commands from different participants on the item, match these trade commands, determine a commission or reward based on the added liquidity and allocate the commission or reward to certain participants.

22 Claims, 6 Drawing Sheets

U.S. PATENT DOCUMENTS

| | | |
|---|---|---|
| 7,006,991 B2 | 2/2006 | Keiser et al. |
| 7,024,386 B1 | 4/2006 | Mills et al. |
| 7,110,972 B1 | 9/2006 | Handa et al. |
| 7,165,048 B2 | 1/2007 | Heppenstall, Jr. |
| 7,222,089 B2 | 5/2007 | Harpale |
| 7,246,092 B1 | 7/2007 | Peterson et al. |
| 7,249,080 B1 | 7/2007 | Hoffman et al. |
| 7,251,620 B2 | 7/2007 | Walker et al. |
| 7,366,690 B1 | 4/2008 | Howorka et al. |
| 7,386,947 B2 | 6/2008 | Gooch |
| 7,398,244 B1 | 7/2008 | Keith |
| 7,401,044 B1 | 7/2008 | Fraser et al. |
| 7,472,087 B2 | 12/2008 | Keith |
| 7,574,395 B2 | 8/2009 | Sweeting |
| 7,590,589 B2 | 9/2009 | Hoffberg |
| 7,685,052 B2 | 3/2010 | Waelbroeck et al. |
| 7,720,742 B1 | 5/2010 | Mauro et al. |
| 2001/0042040 A1 | 11/2001 | Keith |
| 2002/0004776 A1 | 1/2002 | Gladstone |
| 2002/0010672 A1 | 1/2002 | Waelbroeck et al. |
| 2002/0029180 A1 | 3/2002 | Kirwin et al. |
| 2002/0032635 A1 | 3/2002 | Harris et al. |
| 2002/0055901 A1 | 5/2002 | Gianakouros et al. |
| 2002/0099641 A1 | 7/2002 | Mills et al. |
| 2002/0156716 A1 | 10/2002 | Adatia |
| 2002/0161624 A1 | 10/2002 | Bradlee |
| 2002/0161690 A1 | 10/2002 | McCarthy et al. |
| 2002/0169703 A1 | 11/2002 | Lutnick et al. |
| 2002/0194115 A1 | 12/2002 | Nordlicht et al. |
| 2003/0018557 A1 | 1/2003 | Gilbert et al. |
| 2003/0028461 A1 | 2/2003 | Kohorn |
| 2003/0028496 A1 | 2/2003 | Yearworth et al. |
| 2003/0033240 A1 | 2/2003 | Balson et al. |
| 2003/0096651 A1 | 5/2003 | Black |
| 2003/0139997 A1 | 7/2003 | Ginsberg |
| 2003/0149636 A1 | 8/2003 | Lutnick et al. |
| 2003/0154100 A1 | 8/2003 | Sato et al. |
| 2003/0200167 A1 | 10/2003 | Kemp, II et al. |
| 2003/0220867 A1 | 11/2003 | Goodwin et al. |
| 2003/0229571 A1 | 12/2003 | May |
| 2003/0233307 A1 | 12/2003 | Salvadori et al. |
| 2003/0233309 A1 | 12/2003 | Matus et al. |
| 2004/0034591 A1 | 2/2004 | Waelbroeck et al. |
| 2004/0059666 A1 | 3/2004 | Waelbroeck et al. |
| 2004/0073506 A1 | 4/2004 | Tull, Jr. et al. |
| 2004/0088242 A1* | 5/2004 | Ascher et al. ............ 705/37 |
| 2004/0103127 A1 | 5/2004 | Bjornson et al. |
| 2004/0122761 A1 | 6/2004 | Thierer et al. |
| 2004/0138904 A1 | 7/2004 | La Loggia |
| 2004/0153392 A1 | 8/2004 | West et al. |
| 2004/0162772 A1 | 8/2004 | Lewis |
| 2004/0210511 A1 | 10/2004 | Waelbroeck et al. |
| 2004/0236669 A1 | 11/2004 | Horst et al. |
| 2004/0243505 A1 | 12/2004 | Sweeting et al. |
| 2004/0254804 A1 | 12/2004 | Peterffy et al. |
| 2004/0254877 A1 | 12/2004 | Buckwlater et al. |
| 2004/0260639 A1 | 12/2004 | Lundberg et al. |
| 2004/0260640 A1 | 12/2004 | Crosthwaite et al. |
| 2005/0096931 A1 | 5/2005 | Baker et al. |
| 2005/0102219 A1* | 5/2005 | Taylor et al. ............ 705/37 |
| 2005/0102220 A1 | 5/2005 | Stackpole |
| 2005/0108143 A1 | 5/2005 | Beadle et al. |
| 2005/0144109 A1 | 6/2005 | Boni et al. |
| 2005/0149428 A1 | 7/2005 | Gooch et al. |
| 2005/0154662 A1 | 7/2005 | Langenwalter |
| 2005/0160032 A1 | 7/2005 | Lutnick et al. |
| 2005/0171888 A1 | 8/2005 | Daley et al. |
| 2005/0228739 A1 | 10/2005 | Leibowitz |
| 2006/0031154 A1 | 2/2006 | Noviello et al. |
| 2006/0041498 A1 | 2/2006 | Hausman et al. |
| 2006/0080216 A1 | 4/2006 | Hausman et al. |
| 2006/0080220 A1 | 4/2006 | Samuel et al. |
| 2006/0080222 A1 | 4/2006 | Lutnick et al. |
| 2006/0095327 A1 | 5/2006 | Vaughn et al. |
| 2006/0112002 A1 | 5/2006 | Holland et al. |
| 2006/0190386 A1 | 8/2006 | Levy |
| 2006/0218071 A1 | 9/2006 | Sweeting |
| 2006/0242056 A1* | 10/2006 | Walker et al. ............ 705/37 |
| 2006/0247997 A1 | 11/2006 | West et al. |
| 2007/0005487 A1 | 1/2007 | Keith |
| 2007/0022041 A1 | 1/2007 | Durkin et al. |
| 2007/0233595 A1 | 10/2007 | Nordlicht et al. |
| 2007/0276748 A1 | 11/2007 | Shapiro et al. |
| 2008/0040254 A1 | 2/2008 | Waelbroeck et al. |
| 2008/0040255 A1 | 2/2008 | Shapiro et al. |
| 2008/0243713 A1 | 10/2008 | Chiulli et al. |
| 2008/0249924 A1 | 10/2008 | Chiulli et al. |

FOREIGN PATENT DOCUMENTS

| | | |
|---|---|---|
| JP | 2001-249962 | 9/2001 |
| JP | 2001-525963 | 12/2001 |
| JP | 2003-58733 | 2/2003 |
| WO | WO/01/50776 | 7/2001 |
| WO | WO 2004/042514 | 5/2004 |
| WO | WO 2005/004015 | 1/2005 |
| WO | WO 2005/045613 | 5/2005 |

OTHER PUBLICATIONS

U.S. PTO Office Action for U.S. Appl. No. 11/213,601; 15 pages; Jun. 18, 2009.

USPTO Office Action for U.S. Appl. No. 10/023,241; 13 pages; Apr. 9, 2009.

USPTO Office Action for U.S. Appl. No. 10/345,466; 13 pages; Feb. 26, 2009.

Attachment "Forex Software Solutions"—PDF Format.

USPTO Office Action for U.S. Appl. No. 11/213,601, Aug. 26, 2008 (13 pages).

U.S. Appl. No. 11/213,601, filed Aug. 26, 2005, Lutnick, et al.

USPTO Office Action for U.S. Appl. No. 11/213,601 dated Sep. 1, 2011; 22 pages.

USPTO Notice of Panel Decision for U.S. Appl. No. 10/023,241; 2 pages; Jun. 17, 2011.

U.S. PTO Office Action for U.S. Appl. No. 11/495,235; 21 pages; Aug. 19, 2011.

CA Examiner Report for Application No. 2616772 dated Mar. 29, 2012; 4 pages.

JP Office Action for Application No. 2008-524246 dated Nov. 9, 2010; 6 pages (including English Translation).

JP Office Action for Application No. 2008-524247 dated Feb. 22, 2011; 5 pages (including English Translation).

CA Examiner Report for Application No. 2616388 dated Feb. 14, 2012; 3 pages.

CA Examiner Report for Application No. 2616850 dated Apr. 4, 2012; 4 pages.

EP Office Action for EP Application No. 06788951.9 dated 1130/2011; 8 pages.

AU Examiner Report for Application No. 2011204873 dated Feb. 14, 2012; 1 page.

AU Examiner Report for Application No. 2011205039 dated Mar. 30, 2012; 1 page.

JP Office Action for Application No. 2008-524208 dated Feb. 22, 2011; 6 pages.

U.S. PTO Office Action for U.S. Appl. No. 11/495,235; 19 pages; Sep. 28, 2010.

U.S. Appl. No. 12/766,370, filed Apr. 23, 2010; 25 pages.

Extended EP Search Report for EP Application No. 06788951.9 dated Nov. 4, 2010; 6 pages.

Extended EP Search Report for EP Application No. 06788951.9 dated Nov. 4, 2010; 7 pages.

U.S. Office Action for U.S. Appl. No. 12/888,796 dated Nov. 25, 2011; 12 pages.

U.S. PTO Office Action for U.S. Appl. No. 12/766,370; Nov. 30, 2011; 18 pages.

AU Examiner Report for Application No. 2011205038 dated Mar. 30, 2012; 1 page.

Response to Office Action for U.S. Appl. No. 11/213,601 dated Dec. 18, 2009; 5 pages.

Response to Office Action for U.S. Appl. No. 11/213,601 dated Sep. 3, 2010; 14 pages.

Supplemental Response for U.S. Appl. No. 11/213,601 dated Nov. 12, 2010; 14 pages.

Notice of Allowance for U.S. Appl. No. 10/345,466; Dec. 22, 2009; 11 pages.
USPTO Office Action for U.S. Appl. No. 11/213,601 dated Jan. 18, 2011; 13 pages.
Response to Office Action for U.S. Appl. No. 11/213,601 dated Jun. 20, 2010; 15 pages.
Liu, Chen-Ching, Decision Support Tools for trading in deregulated energy Systems, Advanced Power Technologies (APT) Center, University of Washington, IEEE, pp. 409-410, 2001.
Moldovan, et. al. Trading in the Market: An experiment in Group Decision Dynamics, IEEE, 6 pages.
Schoreels, et. al., Agent Based Genetic Algorithm Employing Financial Technical Analysis for Making Trading Decisions Using Historical Equity Market Data, IEEE, pp. 421-424, 2004.
Journal of Beijing University of Technology, The British Library—"The Worlds Knowledge", vol. 30, No. 2, 5 pages, Jun. 2004.
Patent Pending Application entitled System and Method for Routing Trading Orders in an Electronic Trading System Using Trader Lists, by Mathew W. Claus, et. al.; 48 pages; filed Jul. 27, 2006.
Patent Pending Application entitled System and Method for Using Trading Lists in an Electronic Trading System to Route a Trading Order with a Reserved Size, by Mathew W. Claus, et. al.; 44 pages; filed Jul. 27, 2006.
Notification of Transmittal of the international Search report and the Written Opinion of the International Searching Authority for international Application No. PCT/US06/29472; 7 pages; Jul. 31, 2007.
Notification of Transmittal of the international Search report and the Written Opinion of the International Searching Authority for international Application No. PCT/US06/29679; 9 pages; Aug. 20, 2007.
U.S. PTO Office Action for U.S. Appl. No. 11/495,254; 11 pages; Aug. 19, 2008.
Merriam Webster Online Dictionary; Definition for Associate; 2 pages.
U.S. PTO Office Action for U.S. Appl. No. 11/495,236; 27 pages; Oct. 2, 2008.
U.S. PTO Office Action for U.S. Appl. No. 11/495,235; 13 pages; Sep. 3, 2008.
Patent Pending Application entitled System and Method for Limiting Aggressive Trading in an Electronic Trading System, by Mathew W. Claus, et. al.; 34 pages; filed Jul. 27, 2006.
U.S. PTO Office Action for U.S. Appl. No. 11/495,254; 7 pages; Mar. 17, 2009.
U.S. PTO Office Action for U.S. Appl. No. 11/495,235; 13 pages; May 12, 2009.
U.S. PTO Office Action for U.S. Appl. No. 11/495,236; 40 pages; Jun. 18, 2009.
Notice of Allowance for U.S. Appl. No. 11/495,254; May 27, 2010; 22 pages.
Notice of Allowance for U.S. Appl. No. 11/495,236; Jul. 22, 2010; 7 pages.
AU Examiner Report for Applicatoin No. 2006275623 dated Jul. 15, 2009; 2 pages.
AU Examiner Report for Application No. 2006272512 dated Jul. 14, 2009; 3 pages.
AU Examiner Report for Application No. 2006275622 dated Jul. 8, 2009; 2 pages.
Response to Office Action for U.S. Appl. No. 11/213,601 dated Feb. 26, 2009; 12 pages.
Response to Office Action for U.S. Appl. No. 11/495,254 dated Feb. 19, 2009; 17 pages.
Response to Office Action for U.S. Appl. No. 11/495,254 dated Mar. 1, 2010; 18 pages.
Notice of Acceptance for Application No. 2006275623 dated Apr. 14, 2011; 3 pages.
Notice of Acceptance for Application No. 2006272512 dated Apr. 13, 2011; 3 pages.
Notice of Acceptance for Application No. 2006275622 dated Apr. 6, 2011; 3 pages.
U.S. Office Action for U.S. Appl. No. 12/888,796 dated Apr. 8, 2011; 28 pages.
USPTO Office Action for U.S. Appl. No. 10/023,241; 14 pages; Nov. 26, 2010.
BT "Online firms Beginning to provide retail investors with option to direct orders"; Securities Week; Jan. 18, 1999 (Section: Special Section; Securities Industry Internet Update; vol. 26, No. 3; p. 5).
Lucas-Daxim L. Lucas "Trading from wherever, whenever (online Stock Investments)"; Buisnessworld; Aug. 20, 2011, Monday.
Pat Cifaldi "With Globex, Brokers could be trading in a market that never Sleeps"; The Business Journal—Milwaukee; Sep. 19, 1992 (Section: vol. 9; No. 50; Sec 2; p. 10; Milwaukee; WI, US).
IRS releases rough online outline of global trading tax deals; Pratt, tom.; The Investment Dealers Digest: IDD. New York, Apr. 18, 1994.
USPTO Office Action for U.S. Appl. No. 10/023,241; 10 pages; Jul. 7, 2008.
USPTO Office Action for U.S. Appl. No. 10/023,241; 10 pages; Oct. 15, 2007.
USPTO Office Action for U.S. Appl. No. 10/023,241; 20 pages; Dec. 18, 2006.
USPTO Office Action for U.S. Appl. No. 10/023,241; 12 pages; Jun. 5, 2007.
USPTO Office Action for U.S. Appl. No. 10/345,466; 9 pages; Sep. 21, 2007.
USPTO Office Action for U.S. Appl. No. 10/345,466; 8 pages; Jun. 3, 2008.
Smart Computing "Buy & Sell Stock Online"; Recreation Jul. 2000, vol. 6 Issue 7; pp. 116-121 in print issue.
Broker.com, Graduate School of Business Stanford University. Case EC-13, Apr. 26, 2000.
International Search report for International Patent Application No. PCT/US02/39235; 1 page Mar. 7, 2003.
U.S. Appl. No. 09/553,423, filed Apr. 19, 2000, Fraser et al.
U.S. Appl. No. 10/345,466, filed Jan. 14, 2003, Weiss, Joel.
U.S. Appl. No. 10/023,241, filed Dec. 17, 2001, Ginsberg.

* cited by examiner

100.00+ - HIT   10    0 x 10
              | 0 | 10 |

100.00+ - HIT   20    5 x 0
              | 5 | 0 |

100.00+ - HIT   25    0 x 25
              | 0 | 25 |

100.00+ - HIT   30    0 x 20
              | 0 | 20 |
              | 0 |    |

| - 100.01 | x 35 |
|---|---|
| | 10 |
| | 20 |
| | 5 |

| TAK - 100.01 | 35 | 0 x 0 |
|---|---|---|
| | 0 | 0 |
| | | 0 |
| | | 0 |

| − 100.01 | | x 40 |
|---|---|---|
| | | 10 |
| | | 10 |
| | | 10 |
| | | 10 |

| TAK − 100.01 | 20 | 0 x 20 | |
|---|---|---|---|
| | | 0 | 0 |
| | | | 5 |
| | | | 5 |
| | | | 10 |

100.07 -  HIT 20    0 x 0
100.06 -  80x       0    0

100.07 -       HIT 20    0 x 0
100.06 - HIT 30 50x0     0    0

FIG. 6F

ALLOCATION OF COMMISSIONS

CROSS-REFERENCES TO RELATED APPLICATIONS

This application is a divisional of U.S. application Ser. No. 11/213,601, filed on Aug. 26, 2005, which claims the benefit of U.S. Provisional Application No. 60/605,091, filed Aug. 27, 2004, which is hereby incorporated by reference herein in its entirety.

FIELD OF THE INVENTION

This invention relates to the allocation, collection and distribution of commissions received from the trading of financial instruments in electronic trading systems. More particularly, the present invention relates to determining and displaying of commissions charged for trading various tradable items including financial instruments, such as interest-rate-related instruments, equity instruments, derivatives thereof, etc.

BACKGROUND OF THE INVENTION

Electronic matching and dealing systems have found successful application in many trading activities, including the buying and selling of a variety of items including goods, services, and currency and securities. Indeed, almost all trading today involves some computer support, from simple information delivery to sophisticated trading systems that automate transactions at select criteria.

Nevertheless, electronic matching systems have not significantly impacted the issues of formalizing, determining and allocating the commissions or fees charged to various buyers and sellers who participate in different aspects of the trading processes through their transactions. Moreover, the trading logic used by such systems or platforms (which operates similarly to a voice broker in non-electronic trading) typically does not allow for the full disclosure of such commissions and fees to users until after trades have been processed or confirmed.

It would be therefore desirable to provide systems and methods for the electronic trading of such items that implement sophisticated commission allocations in transaction management of items being traded and that fully and clearly disclose, in real-time, the brokerage fees charged to the participants prior to final settlement.

SUMMARY OF THE INVENTION

Therefore, it is an object of the invention to provide systems and methods for the electronic trading of such items that implement sophisticated commission allocations in transaction management of items being traded and that fully and clearly disclose, in real-time, the brokerage fees charged to the participants prior to final settlement.

The above and other objects are accomplished in accordance with the principles of the invention by providing systems and methods that implement commission allocations in transaction management of items such as financial instruments being traded by participants. Participants may include brokers, traders, professionals, customers and users of such systems and methods. The systems and methods may receive a first trade command from a first participant to buy or sell an item at a desired price and a second trade command from a second participant to transact the item. The systems and methods may then match the first and second trade commands thereby executing a trade on the item, determine a commission or reward relating to the trade, and allocate the commission or reward to at least one of the first and second participants.

The systems and methods may allocate different types of commissions or provide commission incentives to different participants based on at least one factor contributing to the liquidity to the market pertaining to the traded items. The level of liquidity added, hence the commission, may depend on the order in which a trading command is received from the participant (e.g., whether there were existing orders at the specified price on the item being traded and the number of such orders) and/or the side of a trade the participant is on. Alternatively or additionally, the level of liquidity added, hence the commission, may depend on the stage during which the participant starts or joins a trade, the degree or extent of participation in the trade, the nature of the item being traded, etc. Such commissions or commission incentives may be varying amounts of brokerage fees, reductions or elimination of the same, rewards such as credit, rebates and combinations of the same. By providing commission incentives, such as reduced commissions, to participants who take particular actions such as showing markets and the monetary value of securities, currency and/or goods for sale, and/or initiating or joining in a transaction for securities, currency and/or goods, these systems and methods reward market participants for contributing to market liquidity, market transparency and/or price discovery.

The systems and methods also fully and clearly disclose, in real-time, the commissions charged to participants, or the rewards given to them, simultaneously with or prior to the execution or confirmation of a trade. For example, in some embodiments of the present invention, the commission or reward may be made explicit through being added to or subtracted from the trade price displayed in real-time to the participants either prior to or immediately after a trade is executed, instead of being added to or subtracted from the final trade price subject to a post-trade settlement process.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 3A-E, 4A-B, 5A-B and 6A-F are illustrations of portions of an interactive display that may be displayed to users in accordance with certain embodiments of the present invention.

DETAILED DESCRIPTION OF THE INVENTION

The invention is directed to systems and methods that implement commission allocations in transaction management of items such as financial instruments being traded by participants. Participants may include brokers, traders, professionals, customers and users of such systems and methods.

The systems and methods may allocate different types of commissions or provide commission incentives to different participants based on at least one factor contributing to the liquidity to the market pertaining to the traded items. The level of liquidity added, hence the commission, may depend on the order in which a trading command is received from a participant (e.g., whether there were existing orders at the specified price on the item being traded and the number of such orders) and/or the side of a trade the participant is on. Alternatively or additionally, the level of liquidity added, hence the commission, may depend on the stage during which the participant starts or joins a trade, the degree or extent of participation in the trade, the nature of the item being traded, etc. Such commissions or commission incentives may be varying amounts of brokerage fees, reductions or elimination of the same, rewards such as credit, rebates and combinations of the same. By providing commission incentives, such as reduced commissions, to participants who take particular actions such as showing markets and the monetary value of securities, currency and/or goods for sale, and/or initiating or joining in a transaction for securities, currency and/or goods, these systems and methods reward market participants for contributing to market liquidity, market transparency and/or price discovery—i.e., the general process of determining prices through the impact of the actions of participants on marketplace supply and demand conditions.

The systems and methods also fully and clearly disclose, in real-time, the commissions charged to participants, or the rewards given to them, simultaneously with or prior to the execution or confirmation of a trade. For example, in some embodiments of the present invention, the commission or reward may be made explicit through being added to or subtracted from the trade price displayed in real-time to the participants, instead of being added to or subtracted from the final trade price subject to a post-trade settlement process. Disclosing the commission or reward prior to the execution of a trade paints a better picture of the full costs involved, thereby giving participants an improved opportunity to consider whether or not to participate in the trade.

Further details of the invention are described below in relation to FIGS. 1-6.

Figure 1:
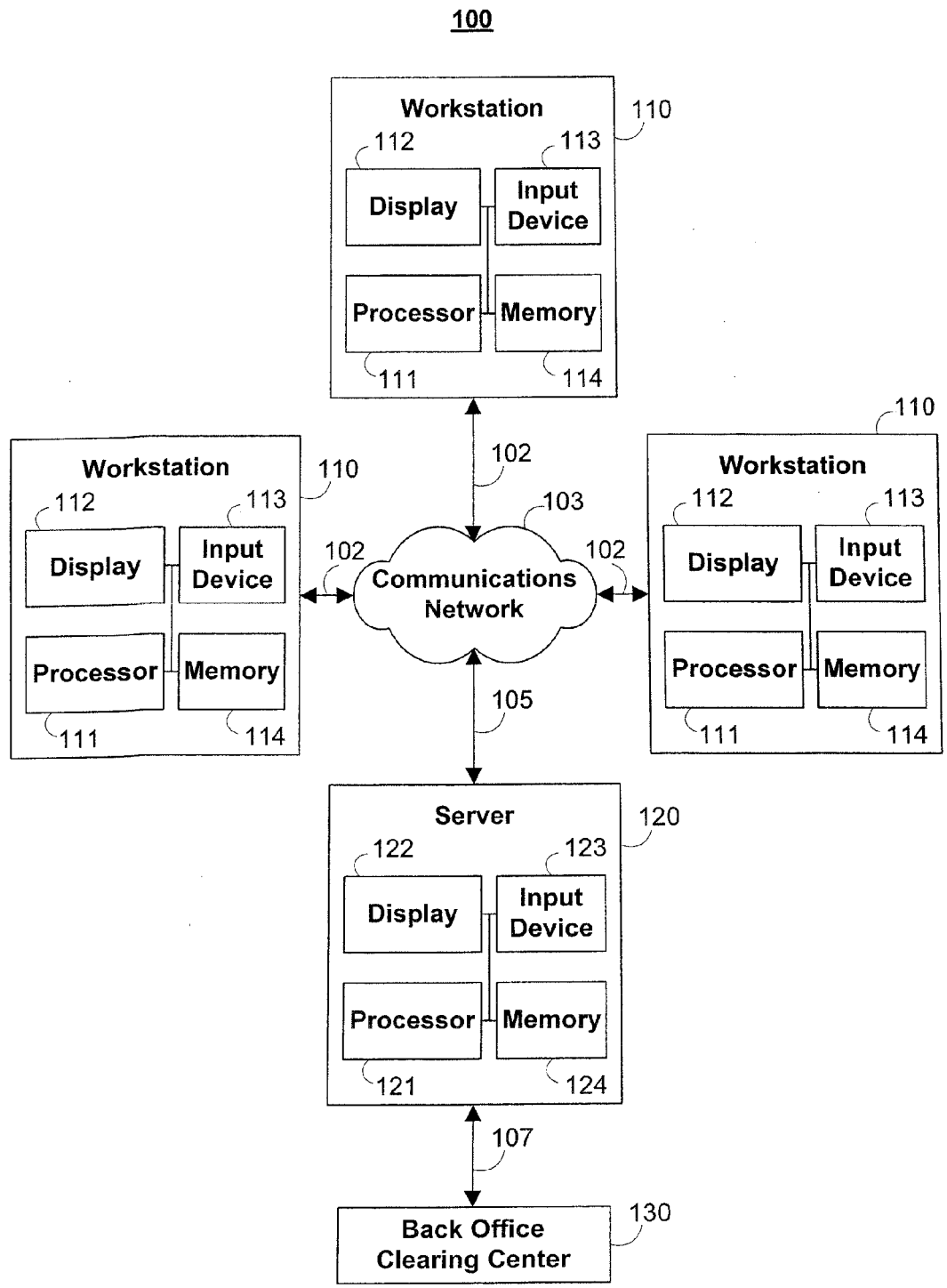
FIG. 1 is a block diagram of an exemplary system that may be used to implement the processes and functions of certain embodiments of the present invention.

Referring to FIG. 1, exemplary system 100 for implementing the invention is shown. As illustrated, system 100 may include one or more workstations 110. Workstations 110 may be local or remote, and are connected by one or more communications links 102 to communications network 103 that is linked via communications link 105 to server 120. Server 120 may be linked to back office clearing center 130 via communications link 107.

Server 120 may be any suitable server, processor, computer, data processing device, or combination of the same. Server 120 may be used to implement the governing logic that processes and executes orders and trades, and distributes trade and market information, including price and size information, to workstations 110. Communications network 103 preferably includes the Internet but may consist of any suitable computer network such as an intranet, a wide-area network (WAN), a local-area network (LAN), a wireless network, a digital subscriber line (DSL) network, a frame relay network, an asynchronous transfer mode (ATM) network, a virtual private network (VPN), or any combination of the same. Communications links 102 and 105 may be any communications links suitable for communicating data between workstations 110 and server 120, such as network links, dial-up links, wireless links, hard-wired links, etc.

Workstations 110 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 110 may be used by participants to enter trade commands such as bid, offer, buy and sell orders for the items being traded and view market activity corresponding to these items. Workstations 110 may also convey the commissions charged or rewards awarded to their users.

A typical workstation 110 may include processor 111, display 112, input device 113, and memory 114, which may be interconnected. In a preferred embodiment, memory 114 includes a storage device for storing a workstation program for controlling processor 111. The workstation program may include a trading application for running the trading interfaces shown in FIGS. 3-6 and displayed on display 112. Input device 113 may be used in conjunction with display 112 by users to enter trade commands such as bids/offers on desired items and to execute and monitor trades. Processor 111 may use the workstation program to receive trade and commission/reward information relating to the items being traded by multiple users of system 100, or other users, and display such information on display 112 or communicate such information to display 112.

Server 120 may include processor 121, display 122, input device 123, and memory 124, which may be interconnected. In a preferred embodiment, memory 124 includes a storage device for storing a server program that provides the governing logic for controlling processor 121. The governing logic may be used to process trade commands received from workstations 100 and may dictate the trading options and screen displays on each workstation. Processor 121 may use the server program to process trade commands communicated from various workstations that are operated by multiple users of system 100, or other users, execute trades determine commissions and rewards and communicate information related thereto to workstations 110 and/or back office clearing center 130. More specifically, processor 121 may use the server program to receive trade commands to on specific items, match such commands, determine corresponding commissions or rewards and allocate them to the different participants as appropriate.

Back office clearing center 130 may be any suitable equipment, such as a computer, a laptop computer, a mainframe computer, etc., or any combination of the same, for causing trades to be settled and/or verifying that trades are settled. Communications link 107 may be any communications links suitable for communicating data between server 120 and back office clearing center 130, such as network links, dial-up links, wireless links, hard-wired links, etc.

Through the workstations, the server and the governing logic, the systems and methods may trade securities at accelerated levels with minimal errors and costs, control commission elements during real-time trading, allocate commissions or fees to market participants, provide incentives for market-makers or participants initiating or joining particular sides of a trade or potential trade or during a stage of trading or a particular trading state and distribute commission and transaction data in real-time.

According to some embodiments of the present invention, the governing logic may provide for a particular sequence of trading states during which each potential trader participates in the transactions that are entered. As each state is provided, different rules to trading may apply. Exemplary states that may be implemented are described in U.S. patent application Ser. No. 09/553,423, filed Apr. 19, 2000, which is hereby incorporated by reference herein in its entirety.

Figure 2:
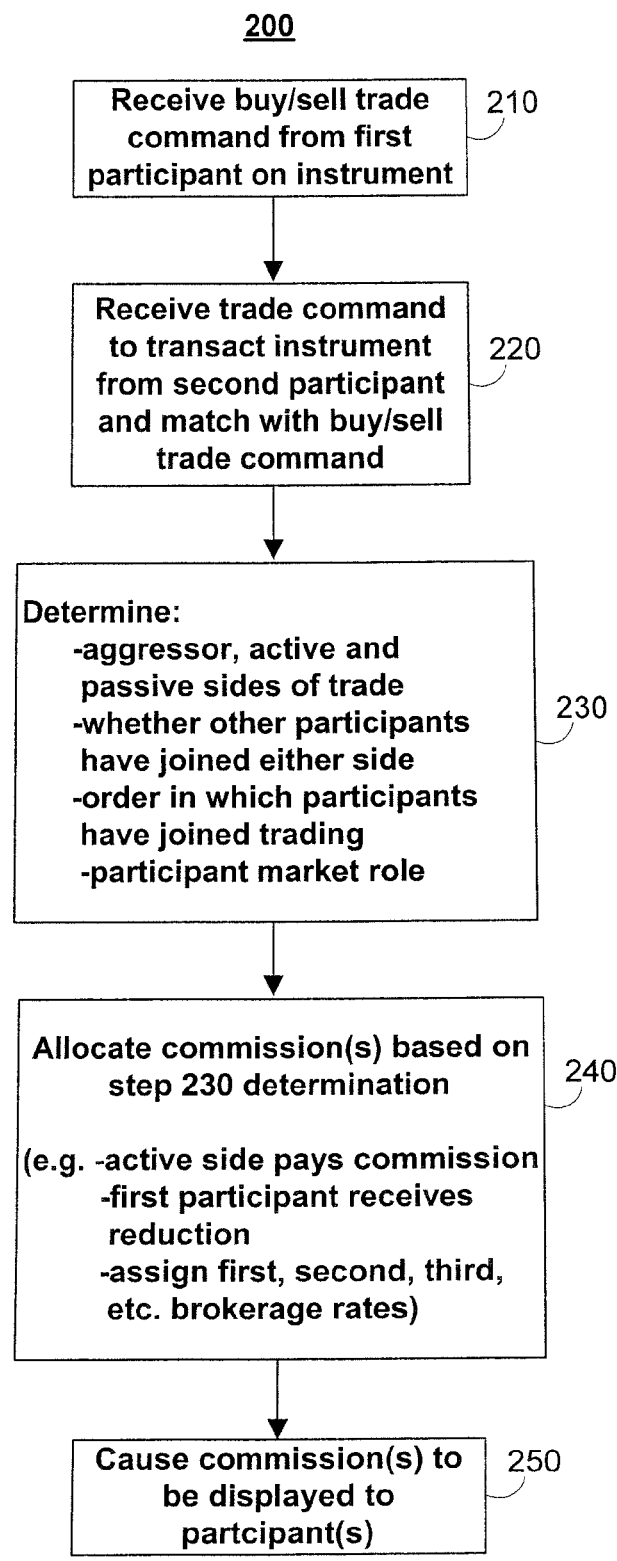
FIG. 2 shows a flow diagram for commission allocation according to certain embodiments of the present invention.

For example, in one such state, participants input bids and offers on various items through the workstations as shown in FIG. 2. FIG. 2 illustrates a process 200 that may be implemented by server 120 of FIG. 1. At step 210, a participant may enter a trade command to buy and/or sell a particular item that is received by the trading application implemented on system 100 of FIG. 1. Such a trade command may be a bid and/or an offer. Each bid and offer may specify the price for which such participants are willing to buy or sell a select item. In addition or instead, each bid and offer may specify the size of the proposed trade—i.e., the monetary volume of the pending bid/offer. Alternatively, the trade command need not specify a particular price or size. For example, a participant may indicate a desire to trade at the market price if certain conditions are met.

The participant who entered such a trade command may be a market-maker. A market-maker may be a participant maintaining a two-sided market on a particular item—i.e., showing a simultaneous bid and offer for the same item at the same time—during market hours, thereby indicating a willingness either to buy or to sell issues of the item in accordance with his or her market role as a facilitator of price discovery, transparency and liquidity. A participant's market role relates to and is defined based on the stage during which he or she starts or joins a potential trade and/or the degree or extent of his or her participation in the trade. A market-maker may be a participant who enters a bid and/or offer on an item, thereby adding liquidity to that item. The market-maker may add such liquidity at the request of the trading system, end users, customers, the general market place or for any other appropriate reason. The market-maker may or may not be the first participant to enter a bid and/or offer on the item.

Once the trade command (e.g., the bid and/or offer position) is displayed on the workstations, another participant or participants may transact a desired size of the item by, for example, accepting the bid or offer at step 220. A first seller or buyer may accept the bid or offer by entering a trading command that is received by the trading application to hit or lift at least a portion of the entire size that is made available in the bid or offer. The governing logic may either automatically or interactively match the different trading commands entered by the participants based on the prices and/or sizes that are specified by the participants. For example, the governing logic may determine whether at least one participant has acted to accept the pending bid or offer and may transact a particular size of the item between them.

At step 230, if a participant acted to accept a bid or an offer, he or she may be promoted to a new level known as an aggressor denoting the active side of the trade. If a participant accepts a pending bid, the aggressor is said to have submitted a hit. In such a case, selling becomes the active side of the trade and buying is passive. If a participant accepts a pending offer, the aggressor is said to have submitted a lift. In such a case, buying becomes the active side of the trade and selling is passive. The governing logic may keep track of both active and passive sides of the transaction in order to properly allocate the appropriate commissions the participant at step 240. Moreover, the governing logic may keep track of other participants joining the trade, the order in which such participants join the trade and/or participant market role at step 230 in order to properly allocate the appropriate commissions to the different participants at step 240. The governing logic may predict what side a potential participant could join a trade as well as his or her market role before the participant acts by, for example, hitting or lifting an existing bid or offer or joining a trade.

For example, the active side may pay the commissions on the ensuing transaction. This allocation of commissions is premised on the notion that the active participants are taking advantage of the price information and liquidity, while the passive participants are supplying price information and liquidity to the market. Entered bids or offers may entitle participants who posted them to commission reductions. Such reductions may also be available to participants maintaining two-sided markets showing current bids and offers on the same items. Such a provision rewards participants, including market-makers, for providing liquidity to the market.

At step 250, the governing logic may cause the commission allocated in step 240 to be displayed to the appropriate participant. The commission may be included in the price displayed to the participant or may be displayed separately. Moreover, the commission may be displayed after a trade is executed. Alternatively, the commission associated with a trade may be displayed prior to the execution of such trade such that the price dynamically changes as trading progresses, as discussed further below. Disclosing the commission prior to the execution of the trade paints a better picture of the full costs involved, thereby giving participants an improved opportunity to consider whether or not to participate in the trade.

Preferably, a participant placing a passive bid or offer will be assigned a first brokerage rate. This rate may be applied to any trade in which the total size posted by the passive participant is hit or lifted. This rate may or may not be applied to new bids or offers locking an already existing price. The price displayed to the participant may reflect this rate. The first brokerage rate may be also referred to as the passive screen display rate, which is discussed in connection with FIGS. 3-6.

According to some embodiments of the present invention, transactions forming a trade may take place during subsequent states. One such state may occur pursuant to a hit or lift by an aggressor hitting or lifting part of or the entire size that is made available by the passive participant. A time period during which exclusive rights to the trade may be given to the aggressor to trade additional size of the item with the passive participant who placed the bid or offer that was hit or lifted by the aggressor may be provided. Such a time period may be pre-determined, may be determined during the period leading up to the trade or may be determined at the time of the trade. At least during such a state, the passive participant who placed the bid or offer that was hit or lifted may be referred to as the contra-trader, while the aggressor may be referred to as the first buyer/seller. The aggressor may be assigned a second brokerage rate that may be greater than the first brokerage rate. Again, this is because the aggressor is taking advantage of the price information and liquidity supplied by the passive participant. This rate may or may not be applied to the full amount hit or lifted by the aggressor. The price displayed to the aggressor may reflect this rate. The price may be updated to reflect such a rate before the aggressor hits or lifts the bid or offer during the trading state. The second brokerage rate may be also referred to as the screen activator rate, which is discussed in connection with FIGS. 3-6.

The first buyer/seller, contra-trader or any third party who bids or offers further size after the initial trade may be assigned a third brokerage rate, in return for the added liquidity. The third brokerage rate may be smaller than the second brokerage rate but greater than the first brokerage rate due to the additional unmatched size contributed to the market. This rate may or may not be applied to any bids or offers previously placed before the initial hit or lift by the aggressor. The third brokerage rate may be also referred to as the passive joiner rate.

Any participant joining the first buyer/seller, contra-trader or third party on the active side for the further size offered after the initial hit or lift may be assigned a fourth brokerage rate. The fourth brokerage rate may be greater than the third brokerage rate for taking advantage of the added liquidity.

This rate may or may not be applied to any hit or lift size previously posted to initiate the trade. The fourth brokerage rate may be also referred to as the active joiner rate.

The price displayed to a participant who bids or offers further size or who joins the first buyer/seller may be updated to reflect the passive or active joiner rate depending on what side the participant is on. The governing logic may predict what side on which the participant may trade and update the price accordingly before the participant takes action.

The above logic may be better understood in the context of the examples discussed in connection with FIGS. 3-6. Each one of these figures shows a portion of an interactive display that may be shown on display 112 of FIG. 1 and that may be associated with the electronic trading of any items including financial instruments, such as equity instruments, interest-rate-related instruments, and derivates thereof. Each one these portions may be referred to as a trading quadrant ("quad"). Common to each quad is a horizontal line above which the cumulative sizes bid, offered and traded (hit or lifted) are displayed, along with the corresponding best price(s) (highest bid and/or lowest offer). Bid sizes are displayed to the left of offer sizes. The individual sizes contributed by each participant are displayed below the horizontal line and are aligned with the corresponding cumulative sizes. Whenever a bid is successfully hit, an indicator displaying the word HIT may appear adjacent to the price. Similarly, whenever an offer is successfully lifted, an indicator displaying the word TAK may appear adjacent to the price. With every successful trade, the total size traded may be updated. The area to the left below the horizontal may be used to display the cumulative sizes bid, offered and traded at the next best price(s).

For example, FIGS. 3A-3E show quad 300 which displays the following actions: 1) a first trader enters a 100.00+ bid for 10 million ("10 m") issues of a particular item as shown in FIG. 3A, 2) a second trader desires to sell 20 m issues into the 100.00+ bid thereby hitting 10 m and offering 10 m as shown in FIG. 3B, 3) the first trader desires to buy another 15 m issues thereby trading 10 m on the original hit for a total of 20 m traded and bidding 5 m as shown in FIG. 3C, 4) the second trader desires to sell another 30 m issues thereby hitting 5 m for a total of 25 m traded and offering 25 m as shown in FIG. 3D, and 5) a third trader joins to buy 5 m issues and trades after the first trader has completed trading for a total of 30 m traded and 20 m left untraded as shown in FIG. 3E. It should be noted that a zero may be displayed in appropriate size locations in the quad to indicate to participants monitoring trading activity that, although some size was available for trading, there is no longer any more size bid or offered.

According to some embodiments of the present invention, the first trader may be charged a passive screen display rate on the initial 10 m issues and a passive joiner rate on her next 15 m issues. The second trader may be charged a screen activator rate on his initial 20 m hit and an active joiner rate on the next 10 m issues (5 m to the first trader and 5 m to the third trader after the first trader is done). The third trader may be charged an active joiner rate on his 5 m issues.

Accordingly, market-makers who have contributed to improving liquidity in less desirable, lucrative or liquid items may be assigned lower first brokerage rates as compared to rates associated with other items. Subsequent trades involving such items may also be assigned lower second, third and fourth brokerage rates.

One of ordinary skill in the art should appreciate that the present invention may be practiced in embodiments other than those illustrated herein. For example, the commission allocation structure described herein may be applied to any kind of trading system or exchange such as auction trading systems, interactive matching systems, automated matching systems, price improvement systems, FIFO (First In, First Out) systems, RFQ (Request for Quote) systems, etc., and may be applied to the trading of any types of items. In any such systems, different commission rates may apply to different participants, depending on what side of a trade they are on, their point of entry to the trade, the degree or extent of their participation in the trade and/or whether there were prior existing bids and offers on the item being traded. Specifically, according to a preferred embodiment of the present invention, market-makers may be charged passive screen display rates, while other customers may be charged screen activator rates and participants subsequently joining a particular trade may be charged passive or active joiner rates, depending on the side of the market and/or stage of the trade these participants choose to join. This includes cases where participants are or are not granted exclusive rights to trade, cases where participants are or are not provided with a share of a trade based on their status such as professional traders, market-makers and generic customers, their market role such as the stage during which they start or join a trade and/or their degree or extent of participation, cases where participants are or are not provided with shares of a trade on a pro-rata basis based on existing agreements or distribution algorithms, or any combination of the same.

For example, the following example discussed in connection with FIGS. 4A and 4B relates to automatic matching of previously entered orders and quotations with incoming orders and quotations. FIGS. 4A and 4B show quad 400 in which the following are entered: 1) a first participant offer of 10 contracts at price 100.01, 2) a second participant offer for 20 contracts at the same price, and 3) a third participant offer for 5 contracts at the same price as well thereby totaling 35 contracts, as shown in FIG. 4A.

Assuming an order to buy 35 contracts at that price is subsequently entered by a fourth party as shown in FIG. 4B, the system may allocate the 35 contracts such that the first participant receives 10 contracts, the second participant receives 20 contracts and the third participant receives 5 contracts. According to some embodiments of the present invention, the first participant may be charged a passive screen display rate, while the second and third participants may be charged a passive joiner rate. The fourth party may be charged a screen activator rate for the trade. Alternatively, the second participant may be charged a reduced passive joiner rate for joining the trading process following the first participant but prior to the third participant.

Accordingly, different brokerage rates may be assigned to participants depending on the order in which their trading commands are successfully received in an automatic matching system and other systems. Trading commands received in different orders may affect liquidity differently. For example, the first few trading commands received on a particular day leading to initial market activity for the item may add more liquidity than the 30th trading command entered as a reaction to the obvious increase in activity for the item later that day.

In other embodiments of the present invention, if the system in the previous example is an exchange that allocates shares based on participant status, where the first participant is a professional trader, the second participant is a market-maker and the third participant is a generic customer, the system may match 5 contracts with the generic customer order to sell 5 contracts first. The system may then allocate the remaining 30 contracts such that the market-maker receives 20 and the professional trader receives 10. If the fourth party order was for 30 contracts instead of 35, the system may allocate the remaining 25 contracts on a pro-rata basis between the market-maker and the professional trader, after matching 5 contracts with the generic customer. In such a situation, a pro-rata agreement may be in effect between the participants. A pro-rata agreement is an agreement that relates to the allocation of size exchanged between participants whereby size traded at a price is distributed amongst buyers or sellers not on a first-come first-served basis, but as a pro-rata share according to how much size is available for matching. For example, if an 80%/20% agreement exists in favor of the market-maker, the market-maker may receive 20 contracts, while the professional trader may receive 5. Alternatively, the system may allocate the remaining 25 contracts between the market-maker and the professional trader according to an existing distribution algorithm. In any event, according to some embodiments of the present invention, the market-maker may be charged a passive screen display rate. Both the generic customer and the professional trader may be charged a passive joiner rate, while the fourth party may be charged a screen activator rate for the trade.

The following discussion in connection with FIGS. 5A and 5B is an example of another embodiment of the present invention relating to automatic matching.

FIGS. 5A and 5B show quad 500 of an interactive display in which: 1) a first participant shows an offer of 10 contracts at price 100.01, 2) a second participant subsequently shows an offer for 10 contracts at the same price, 3) a third participant subsequently shows an offer for 10 contracts at the same price, and 4) a fourth participant subsequently shows an offer for 10 contracts at the same price as well thereby totaling 40 contracts, as shown in FIG. 5A.

In this case, an order to buy 20 contracts at that price is subsequently entered by a fifth party as shown in FIG. 5B. The system may allocate the 20 contracts between the parties such that the first participant sells more than 5 contracts, and the second, third and fourth participants sell 5 or fewer contracts, for a total transaction size of 20 contracts, the allocation being made subject to an algorithm pursuant to a pro-rata agreement in effect between the parties. For example, the first participant may sell all 10 of his contracts, while the second and third sell 5 each and the fourth does not sell any. The first participant may be charged a passive screen display rate, while the second and third participants may be charged a passive joiner rate. The fifth party may be charged a screen activator rate for the trade. Alternatively, the second participant may be charged a reduced passive joiner rate for joining the trading process following the first participant but prior to the third and fourth participants.

The following discussion in connection with FIGS. 6A-6F is an example of yet another embodiment of the present invention in a marketplace which starts off an auction among participants to compete for the size being sold. FIGS. 6A-6F show quad 600 of an interactive display in which a sell order for a particular size is received from a first party for a particular item. This sell order may have an initial price at which the first party is willing to sell, or may not be priced. Further suppose that: 1) a market-maker enters a 100.05 bid for a 50 m size of the item in FIG. 6A, 2) a broker improves upon the bid by entering a bid for 100.06 for a 30 m size of the item in FIG. 6B, 3) the market-maker joins the broker at 100.06 in FIG. 6C and cancels her previous bid, and 4) a second broker enters a 100.07 bid for a 20 m size of the item in FIG. 6D. Assuming an order to sell a 50 m size at the best price by the first party, the system may match 20 m size with the second broker's order at 100.07, which is the best available price, in FIG. 6E. The system may then allocate the remaining 30 m size between the market-maker and the first broker at 100.06, which is the next best available price, in FIG. 6F.

The market-maker may be granted most of the size for making the market or according to a distribution algorithm or existing agreement between the various participants. According to some embodiments of the present invention, each one of the market-maker and the two brokers may be charged a passive joiner rate for showing a new price on their side of the market. Alternatively, the market-maker only may be charged a passive screen display rate, while both brokers may be charged passive joiner rates for entering after the market-maker has shown the market. Meanwhile, the first party may be charged a screen activator rate if his sell order was entered after the market-maker's bid. Had the first party entered his order prior to the market-maker's entering the bid with an associated sell price, the first party may be charged a passive screen display rate, on account of being the first party to show a price, thus setting the starting level for the auction.

Whenever applicable, the commissions charged to the participants, or the rewards given to them, may be added to, or subtracted from, the trade price displayed to the participants with or prior to the execution or confirmation of the trade in FIGS. 3-6. As such, the trading price may be dynamically updated as trading progresses in a given trading state.

It should be understood that the foregoing is only illustrative of the principles of the present invention, and that various modifications can be made by those skilled in the art without departing from the scope and spirit of the invention.

The trading application described herein may be any suitable, software, hardware, or both configured to implement the features of the invention. The trading application may be located at a central location (e.g., a central server such as server 120 of FIG. 1) and instances thereof may be stored on workstations connected thereto (e.g., workstations 101 of FIG. 1). In another suitable approach, the trading application may reside among different locations (e.g., a network such as communications network 103 of FIG. 1).

The trading systems and methods described above, or variation thereof, may be implemented in conjunction with the interactive displays discussed or shown herein, or in conjunction with variations on those displays.

One of ordinary skill in the art should appreciate that the invention may be practiced in embodiments other than those described herein. For example, it will be understood that the size, shape, arrangement and labels of various portions of the interactive displays discussed or shown are examples shown for purposes of illustration only. It will be understood that modifications of any or all of the foregoing characteristics of these portions are within the scope of the invention.

It will be understood that the foregoing is only illustrative of the principles of the invention, and that various modifications can be made by those skilled in the art without departing from the scope and spirit of the invention, and the invention is limited only by the claims that follow.

What is claimed is:

1. A method comprising the steps of:
when an electronic trading system matches a first trade command from a first participant to a second trade command from a second participant to transact a financial instrument traded on the trading system, computing and storing in the memory of the electronic trading system a first transaction commission to charge to the first participant and a second transaction commission to charge to the second participant, the two commissions being different from each other, the commission rate charged for the earlier of the first and second trade commands being lower than the commission rate charged to the later of the first and second trade commands; and in the event that the first and second trade commands specify different quantities of the financial instrument, permitting a joiner participant in the electronic trading system to join the transaction to trade the excess of the larger of the two quantities remaining after satisfying the smaller of the first and second trade command, and recording in the memory of the electronic trading system a charge to the joiner participant a commission based on a rate for joiner parties that is different than the commission rates charged for the first and second trade commands.

2. The method of claim 1, wherein:
one of the first and second transaction commissions is computed to be zero based at least in part on the aggressor/passive status of the participant to be charged the zero commission.

3. The method of claim 1, further comprising the step of:
charging a commission rate to the joiner participant that is higher than the commission rate charged to the one of the first and second participant that is on the same side as the joiner participant.

4. The method of claim 3, wherein:
as a result of the joiner participant being on the same side of the market as the earlier of the first and second trade command, charging a commission rate to the joiner participant that is higher than the commission rate charged to the earlier of the first and second trade command, and lower than the commission rate charged to the later of the first and second trade command.

5. The method of claim 1, wherein:
computing the commissions includes computing a commission for the participant on the active side of the trade that is higher than the commission computed for the participant on the passive side of the trade.

6. The method of claim 1, wherein:
computing a reduction in commission for the participant on the passive side of the trade.

7. The method of claim 1, wherein:
computing a commission for a passive joiner participant or active joiner portion of a transaction that is different than for, respectively, other participants to or portions of the transaction.

8. The method of claim 1, wherein:
computing a commission for a participant that enters a trading command at a time of lower market liquidity than the commission for a similarly-situated trading command at a time of higher market liquidity.

9. The method of claim 1, wherein:
displaying the computed commission, or a price for the transaction net of the computed commission, to at least one of the first, second, and joiner participants before the participant indicates execution of the trade.

10. The method of claim 1, wherein:
as a result of the joiner participant being on the same side of the market as the later of the first and second trade command, charging a commission rate to the joiner participant that is higher than the commission rate charged to the later of the first and second trade command.

11. The method of claim 1, wherein:
the joiner participant is the same participant as either the first participant or second participant.

12. A method comprising the steps of:
when an electronic trading system matches a first trade command from a first participant to a second trade command from a second participant to transact a financial instrument traded on the trading system, computing and storing in the memory of the electronic trading system a first transaction commission to charge to the first participant and a second transaction commission to charge to the second participant, the two commissions being different from each other, the difference based at least in part on a commission schedule that is different for an active joiner participant or active joiner portion of a transaction than for, respectively, other participants to or portions of the transaction, an "active joiner" being a participant who bids or offers further size or who joins a trade on the same side as the first active buyer or first active seller to execute on the trade; and displaying the computed commission or price for the transaction net of the computed commission to at least one of the first, second, and active joiner participants before the respective participant indicates execution of the trade.

13. A computer-readable non-transitory memory, having stored therein one or more programs designed to cause one or more computers of an electronic trading system to:
when the electronic trading system matches a first trade command from a first participant to a second trade command from a second participant to transact a financial instrument traded on the trading system, compute and store in the memory of the electronic trading system a first transaction commission to charge to the first participant and a second transaction commission to charge to the second participant, the two commissions being different from each other, the commission rate charged for the earlier of the first and second trade commands being lower than the commission rate charged to the later of the first and second trade commands; and in the event that the first and second trade commands specify different quantities of the financial instrument, permitting a joiner participant in the electronic trading system, the joiner participant being different than the first and second participants, to join the transaction to trade the excess of the larger of the two quantities remaining after satisfying the smaller of the first and second trade command, and charging the joiner participant a commission rate for joiner parties that is different than the commission rates charged for the first and second trade commands.

14. The non-transitory memory of claim 13, wherein:
one of the first and second transaction commissions is computed to be zero based at least in part on the aggressor/passive status of the participant to be charged the zero commission.

15. The non-transitory memory of claim 13, wherein the programs designed to cause one or more computers to:
charge a commission rate to the joiner participant that is higher than the commission rate charged to the one of the first and second participant that is on the same side as the joiner participant.

16. The non-transitory memory of claim 13, wherein:
the programs are programmed to, in cases where if the joiner participant is on the same side of the market as the earlier of the first and second trade command, and if so, to cause a commission rate to be charged to the joiner participant that is higher than the commission rate charged to the earlier of the first and second trade command, and lower than the commission rate charged to the later of the first and second trade command.

17. The non-transitory memory of claim 13, wherein:
computing the commissions includes computing a commission for the participant on the active side of the trade that is higher than the commission computed for the participant on the passive side of the trade.

18. The non-transitory memory of claim 13, wherein:
computing a reduction in commission for the participant on the passive side of the trade.

19. The non-transitory memory of claim 13, wherein:
computing a commission for an active joiner participant or active joiner portion of a transaction that is different than for, respectively, other participants to or portions of the transaction.

20. The non-transitory memory of claim 13, wherein:
computing a commission for a passive joiner participant or active joiner portion of a transaction that is different than for, respectively, other participants to or portions of the transaction.

21. The non-transitory memory of claim 13, wherein:
computing a commission for a participant that enters a trading command at a time of lower market liquidity than the commission for a similarly-situated trading command at a time of higher market liquidity.

22. A method comprising the steps of:
when an electronic trading system matches a first trade command from a first participant to a second trade command from a second participant to transact a financial instrument traded on the trading system:
computing and storing in the memory of the electronic trading system a first transaction commission to charge to the first participant;
computing and storing in the memory of the electronic trading system a second transaction commission to charge to the second participant;
the two commissions being different from each other;
the commission rate charged for the earlier of the first and second trade commands being lower than the commission rate charged to the later of the first and second trade commands; and
in the event that the first and second trade commands specify different quantities of the financial instrument:
permitting a joiner participant in the electronic trading system to join the transaction to trade the excess of the larger of the two quantities remaining after satisfying the smaller of the first and second trade command, and recording in the memory of the electronic trading system a charge to the joiner participant a commission;
the commission charged to the joiner participant based on a rate for joiner parties that is different than the commission rates charged for the first and second trade commands.

* * * * *